(12) United States Patent
Tenegal et al.

(10) Patent No.: US 9,005,511 B2
(45) Date of Patent: *Apr. 14, 2015

(54) SYSTEM AND METHOD FOR CONTINUOUS FLOW PRODUCTION OF NANOMETRIC OR SUB-MICROMETRIC POWDERS BY THE ACTION OF LASER PYROLYSIS

(75) Inventors: François Tenegal, Paris (FR); Benoit Guizard, Creteil (FR)

(73) Assignee: Commissariate a l'Energie Atomique, Paris (FR)

( * ) Notice: Subject to any disclaimer, the term of this patent is extended or adjusted under 35 U.S.C. 154(b) by 906 days.

This patent is subject to a terminal disclaimer.

(21) Appl. No.: 12/096,362

(22) PCT Filed: Dec. 4, 2006

(86) PCT No.: PCT/EP2006/069248
§ 371 (c)(1),
(2), (4) Date: Jun. 5, 2008

(87) PCT Pub. No.: WO2007/065870
PCT Pub. Date: Jun. 14, 2007

(65) Prior Publication Data
US 2009/0014921 A1    Jan. 15, 2009

(30) Foreign Application Priority Data
Dec. 8, 2005 (FR) ..................... 05 53772

(51) Int. Cl.
*B28B 17/00* (2006.01)
*H05B 6/00* (2006.01)
*B01J 19/12* (2006.01)

(52) U.S. Cl.
CPC .................. *B01J 19/121* (2013.01)

(58) Field of Classification Search
USPC ........................ 425/174.4; 264/842
See application file for complete search history.

(56) References Cited

U.S. PATENT DOCUMENTS

| 6,068,800 | A | * | 5/2000 | Singh et al. ............ 264/8 |
| 2005/0205838 | A1 | | 9/2005 | Doan |
| 2007/0295702 | A1 | * | 12/2007 | Tenegal et al. ........ 219/121.84 |

FOREIGN PATENT DOCUMENTS

| WO | 9837961 | | 9/1998 | |
| WO | 00/27523 | * | 5/2000 | ........... B01J 19/08 |
| WO | 0027523 | | 5/2000 | |
| WO | 0107155 A1 | | 2/2001 | |
| WO | 2006/051233 | * | 5/2006 | ........... B01J 12/00 |
| WO | 2006051233 A1 | | 5/2006 | |

OTHER PUBLICATIONS

International Preliminary Report, Application No. PCT/EP2006/069248, dated Jan. 23, 2008, English translation.

* cited by examiner

*Primary Examiner* — Daniel C McCracken
(74) *Attorney, Agent, or Firm* — Nixon Peabody LLP

(57) ABSTRACT

The invention relates to a system for continuous flow production of nanometric or sub-micrometric powders under the action of laser pyrolysis by interaction between a beam emitted by a laser and a flow of reagents emitted by at least one injector, wherein the laser is followed by an optical device allowing the energy of the beam to be distributed along an axis perpendicular to the axis of the flow of reagents, in an elongated cross-section with adjustable dimensions at least at one interaction area between this beam and the flow of reagents emitted by at least two injectors located perpendicularly to the axis of the beam. It also concerns a method for producing such powders.

7 Claims, 2 Drawing Sheets

SYSTEM AND METHOD FOR CONTINUOUS FLOW PRODUCTION OF NANOMETRIC OR SUB-MICROMETRIC POWDERS BY THE ACTION OF LASER PYROLYSIS

CROSS REFERENCE TO RELATED APPLICATIONS OR PRIORITY CLAIM

This application is a national phase of International Application No. PCT/EP2006/069248, entitled "SYSTEM AND METHOD FOR CONTINUOUS FLOW PRODUCTION OF NANOMETRIC OR SUB-MICROMETRIC POWDERS BY THE ACTION OF LASER PYROLYSIS", which was filed on Dec. 4, 2006, and which claims priority of French Patent Application No. 05 53772, filed Dec. 8, 2005.

TECHNICAL FIELD

The present invention relates to a system and method for continuous flow production of nanometric or sub-micrometric powders under the action of laser pyrolysis

STATE OF THE PRIOR ART

In the field of dense materials elaborated by powder metallurgy, breaking strength, hardness, wear resistance properties for mechanical and thermomechanical applications, tend to gradually improve as the size of the powder grains decrease. When this size reaches the nanometric range (1 to 100 nanometers), these properties may strongly develop and good flowability may then be observed, with possible superplasticity (a polycrystalline material is described as superplastic when it may withstand a tensile deformation of more 100% without exhibiting striction) in the case of $ZrO_2$, SiC, $Si_3Na_4$/SiC nanocomposites and Cu. With flowability, hot-forming of ceramics may for example be contemplated while avoiding the machining steps. But the methods for elaborating materials using nanometric powders are still poorly controlled because of the specific characteristics of these powders (reactivity, agglomeration . . . ), of their availability and their cost. As regards non-oxide nanometric powders, pyrophoric effects may prove to be dangerous and formation of a surface screening layer is required. Coating of the grains with organic or mineral screening materials is then desirable.

In the field of catalysis for treating effluents, with nanometric oxide powders doped with metals (for catalysis), it is possible to obtain deposits with increased catalytic activity, provided that proper dispersion of the active phases is obtained at the surface of these powders.

In the field of cosmetics, by using $TiO_2$ or ZnO powders in the formulations, protection in the ultraviolet range may be increased. By using photochromic nanometric powders, new colored products may also emerge.

In the field of flat screen devices, by using nanometric powders it is possible to make strongly luminescent deposits with an adjustable wavelength (P doped with ZnO or ZnS, Si), In the field of energy storage, by using nanometric composite oxide powders for elaborating lithium battery electrodes, the energy storage capacities may be increased.

In these different fields, remarkable improvements in properties may thereby be obtained by using nanometric (5-100 nanometers) or sub-micrometric (100-500 nanometers) powders.

Many methods for synthesizing such powders exist, notably flow laser pyrolysis.

This method is based on the interaction between the emission of a $CO_2$ power laser and a flow of reagents consisting of gas, liquid as aerosols or of a mixture of both, so that the chemical composition of the powder may be multi-element. With the velocity of the reagents passing into the laser beam, the size of the powders may be controlled. The flow of reagents absorbs the energy of the laser beam, which leads to decomposition of the reagent molecules and then to the formation of particles by homogenous germination and growth in a flame. The growth of the particles is blocked by a quenching effect. This method is a flexible application method with which various nanometric powders of the carbide, oxide or nitride type may be synthesized with high yields. It is also suitable for the synthesis of composite powders such as Si/C/N powders or further Si/C/B powders.

The document referenced as [1] at the end of the description describes a device for mass synthesis of such powders, by flow laser pyrolysis by elongating the cross-section of the injectors of reagents along the major axis of the laser beam. This device comprises a reaction chamber with a window for introducing the laser beam and an elongated aperture of the injectors. In this device, radial focussing by a lens causes an increase in the power density at the focal point but also a reduction in production rates because the cross-section of the injectors must be reduced relative to the non-focussed case. This device makes abstraction of the power density parameter which is a key parameter which has an influence on the structure, composition, size of powder grains as well as on the yields. This device is unable to ensure large scale production of powders requiring the use of large power densities. Extrapolation of the production rates is thus carried out to the detriment of possible adjustment of the characteristics of the powders. Further, the cross-section of the injectors cannot be elongated too significantly in the axis of the laser beam. Indeed, as the reagent flow is gradually penetrated by the laser, there is gradual absorption of energy until the remaining energy is no longer sufficient. As the pyrolysis reaction is a reaction with a threshold effect, there is a moment when the incident energy per square centimeter becomes too small to initiate the synthesis reaction. Further, the decrease in the amount of energy absorbed as the reagent flow is penetrated, may be such as to induce modifications in structure, size and composition of the powder formed in a same batch, all the more so since the incident laser power is high.

The document referenced as [2] at the end of the description describes methods for producing abrasive particles, for example nanometric particles. This document discloses the interaction between a beam emitted by a laser and a reagent flow in an interaction area. But these methods do not allow high production rates over a large range of power densities.

The object of the invention is to overcome these drawbacks by giving the possibility, by mass synthesis of nanometric or sub-micrometric powders based on the principle of flow laser pyrolysis, of producing at a low cost more than 500 grams per hour of such powders in a continuous flow.

DISCLOSURE OF THE INVENTION

The invention relates to a system for producing nanometric or sub-micrometric powders in a continuous flow under the action of laser pyrolysis by interaction between a beam emitted by a laser and a flow of reagents emitted by at least one injector, characterized in that the laser is followed by an optical device allowing the energy of the beam to be distributed along an axis perpendicular to the axis of the flow of reagents in an elongated for example rectangular cross-section, with adjustable dimensions at least at one interaction area between the beam and a flow of reagents emitted by at least two injectors located perpendicularly to the axis of the beam.

Advantageously, the power density of the beam is the same before reaching each interaction area.

As compared with the document referenced as [2], the fact that the optical device allows the energy of the laser beam to be distributed along an axis perpendicular to the axis of the flow of the reagents in an elongated section with adjustable dimensions, allows significant increase in the production rates over a wide range of power densities.

The invention also relates to a method for continuous flow production of nanometric or sub-micrometric powders under the action of a laser pyrolysis by interaction between a beam emitted by a laser and a flow of reagents emitted by at least one injector, characterized in that the energy of the beam is distributed along an axis perpendicular to the axis of the reagent in an elongated for example rectangular cross-section with adjustable dimensions at least at one area of interaction between this beam and a flow of reagents emitted by at least two injectors located perpendicularly to the axis of the beam.

Advantageously, the power density absorption loss of this beam in an interaction area is compensated by concentrating the energy flow in the following interaction area.

In a first embodiment, mixtures of nanoparticles of different natures are produced by changing the nature of the precursors from one injector to another for a same interaction area.

In a second embodiment, tracers are introduced in batches of nanoparticles in order to be able to track the batches of nanoparticles after their synthesis, this being achieved by using one of the injectors of an interaction area for the synthesis or introduction of tracer species.

With the method of the invention it is possible to ensure production of large amounts (larger than 500 grams/hour) of nanometric powders (5-100 nanometers) or sub-micrometric powders (100-500 nanometers) in a continuous flow. With the method of the invention it is possible to enhance hourly production rates and to consume almost the whole (more than 90%) of the energy of the laser. Additionally, powders of same characteristics (chemical composition, structure, size, yields) may be produced at the exit of different interaction areas. Finally, powders with improved chemical yields may be produced.

With the method of the invention, the incident powder density may be changed, according to the desired characteristics of the powder, by changing the position of the injectors along the axis of the laser beam or by modulating the output power of the laser.

DETAILED DISCUSSION OF PARTICULAR EMBODIMENTS

Figure 1:
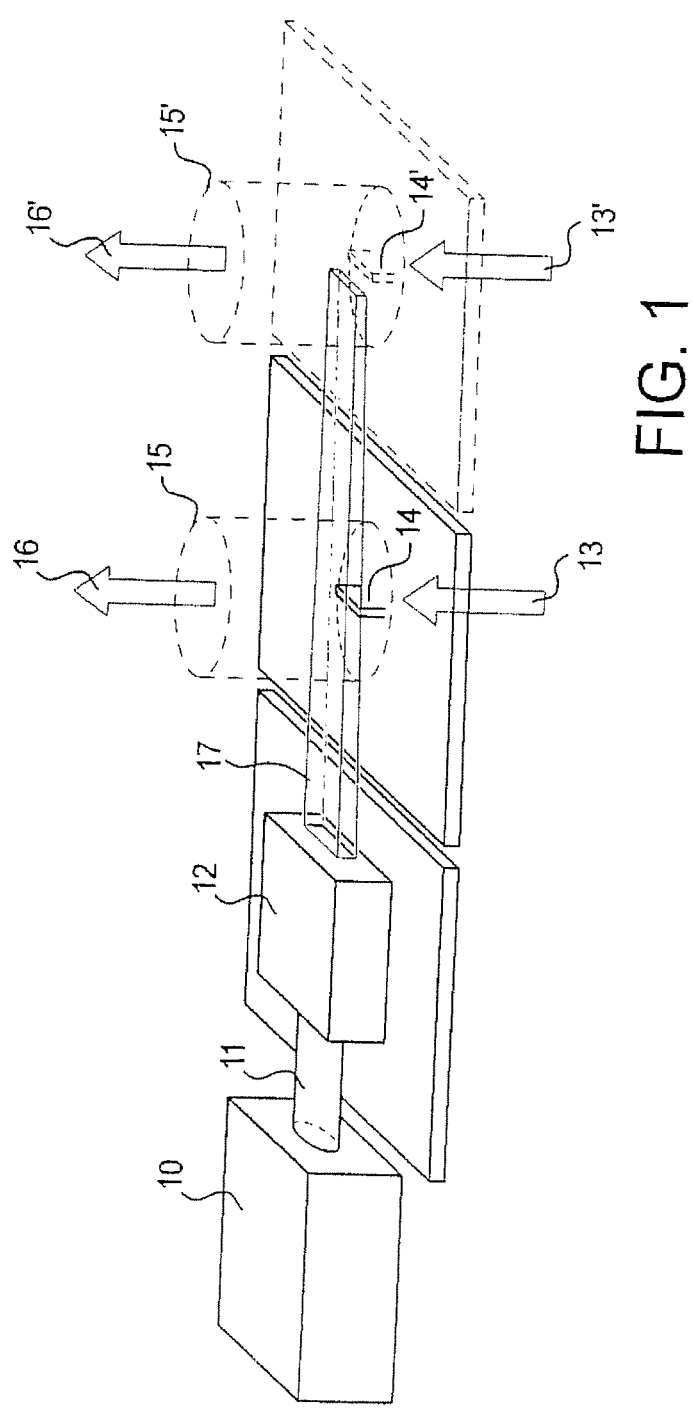
FIG. 1 schematically illustrates a system for producing nanometric or sub-micrometric powders in a continuous flow under the action of laser pyrolysis.

As illustrated in FIG. 1, a system for continuous flow production of nanometric or sub-micrometric powders under the action of laser pyrolysis may comprise a laser 10, which delivers a beam 11, followed by an optical device 12 with which the energy of the beam may be distributed at 17 along an axis perpendicular to the axis of a flow of reagents 13, in an elongated for example rectangular or elliptical cross-section with adjustable dimensions at least at one interaction area 15 between this beam and this flow of reagents 13 emitted by at least one injector 14, the production of powders being referenced as 16.

The shaping of the laser beam into an elongated for example rectangular shape enhances high hourly production rates for powders for which the size, composition and structure may be adjusted. The energy of the beam may thereby be distributed over a rectangular or elliptical cross-section, the width or height of which may be changed independently.

The adjustment of the power density allowed for such shaping allows formation of powders with sizes which may exceed 100 nanometers and be close to 500 nanometers. Enlargement of the grains may also be obtained by strongly reducing the reagent flow rates.

Advantageously the energy of the laser beam may be absorbed in several successive interaction areas 15, 15' until the energy of the laser beam is entirely absorbed. The power density parameter is then maintained identical in all of the interaction areas, while compensating the absorption loss in a given area N−1 by a concentration of the energy flux in the next area N. Thus almost the whole of the energy flux is absorbed in order to produce nanometric powders, the interaction areas 15, 15' producing less and less powders as one advances along the path of the beam. A maximum energy yield is thereby obtained.

This method thus has many advantages as compared with the method analyzed above, described in the document referenced as [1], notably:

The increase in the production rate is obtained by lateral extension of the cross-section for injecting the reagents.

The elongated shaping, notably into a rectangular or elliptic shape, of the laser beam provides significant increase in the production rate over a large power density range.

The cross-section of the injectors for emitting the reagents may be maintained constant over a larger power density range.

As compared with the system illustrated in FIG. 1, the system of the invention comprises at least one interaction area 20, 20' between the beam 17 and a flow of reagents emitted by several injectors 22, 23, 24 located perpendicularly to the axis OX of the beam 17 so that the flows of reagents exiting the injectors are all covered by the elongated spot.

Figure 2:
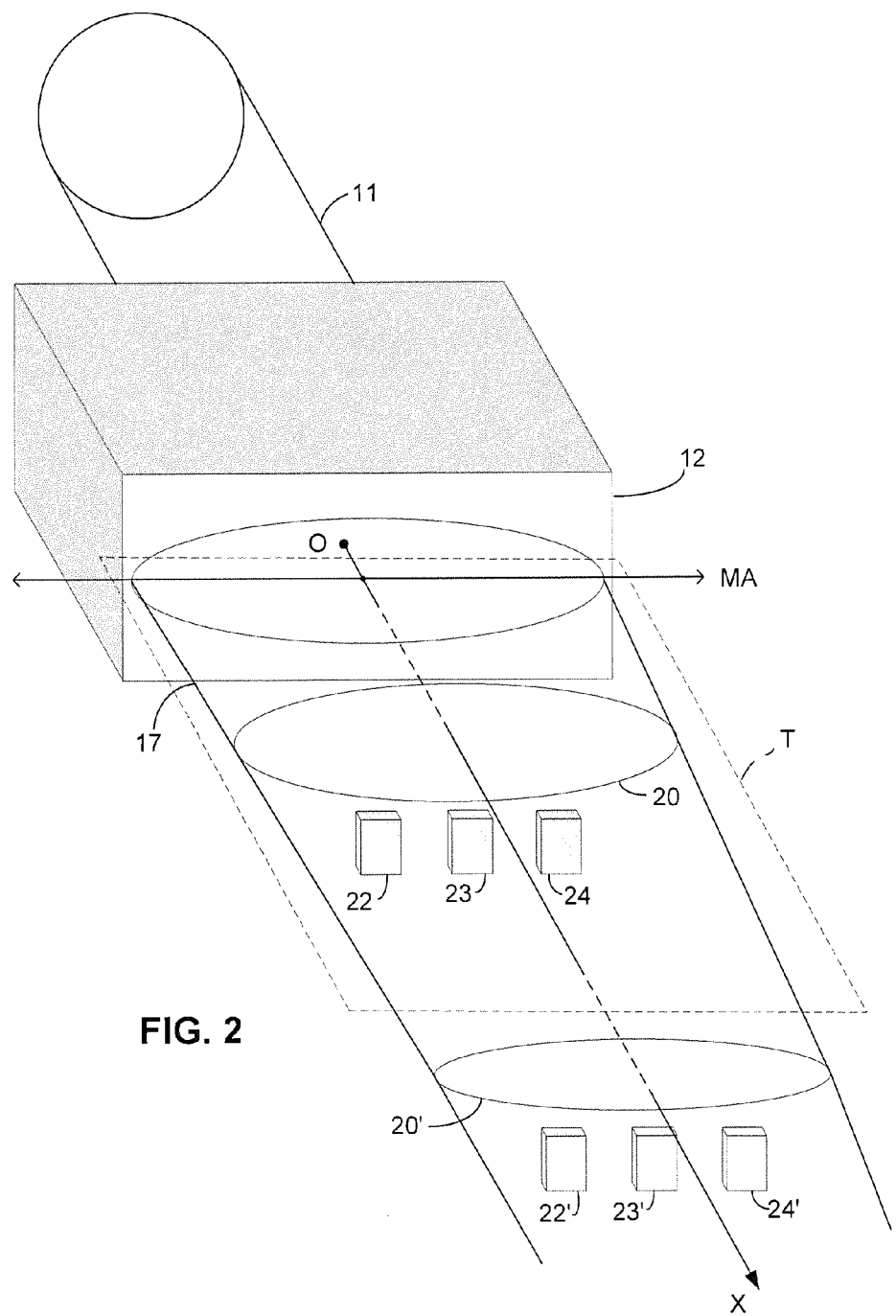
FIG. 2 illustrates the system of the invention.

In FIG. 2, the first interaction area 20 may be a power density area P. The second area 20' may also be a power density area P because of the vertical focussing which compensates the absorption losses at the first area 20.

Such a configuration has several advantages:

1—From the point of view of the homogeneity of the produced particles, this configuration allows production of powder particles having a narrower size distribution than in the case of the system illustrated in FIG. 1 with analogous production rates.

In an example for producing nanometric SiC powders by using three injectors 22, 23, 24 located perpendicularly to the axis OX of the beam 11, an optical device 12 is used in order to distribute the power along an axis perpendicular to the axis of the beam 11. The mixing flow rates of silane (SiH4) and acetylene (C2H2), which are the precursor gases used for producing nanometric SiC particles, are 3 and 1.5 l/minute respectively. Each injector produces, independently of its neighbour, 300 g/h of SiC nanoparticules with an average of diameter of 20 nm and with a size distribution of + or −5 nm. On the whole, 900 g/h of SiC nanoparticules with a diameter of 20 nm +/−5 nm are therefore produced.

It is of interest to have a small size distribution for several applications. Properties of sintered ceramics and more particularly of nanoceramics are for example strongly dependent on the size dispersion of the grains which make them up, this dispersion itself being dependent on the size dispersion of the particles of the powder batches used. For example, it is known that in order to obtain ceramics with improved mechanical or thermomechanical properties, it is required that the latter have a narrow distribution around the average size of the grains.

2—Mixtures of nanoparticles of different natures may be produced by changing the nature of the precursors from one injector to the other for a same interaction area. Thus, mixtures of powders may be formed in situ. With this mixing operation in situ, it is possible to avoid mixing operations ex situ for nanometric powders which may prove to be particularly dangerous. Indeed, certain nanoparticles may prove to be toxic. It is therefore important to apply secured means for producing them and handling them, mixing them. This is the case of the system of the invention.

3—Introduction of tracers into the batches of nanoparticles may be contemplated in order to be able to track the batches of nanoparticles after their synthesis. This may be achieved by using one of the injectors of an interaction area for synthesis or introduction of tracer species (silicon quantum dots for example). These tracers attached to the batches of nanoparticles may have applications in the field of prevention of risks associated with the handling of batches of nanoparticles. Indeed, with these tracers, the particles may be tracked all along the transformation chain (from the synthesis of the batch to its integration into the final product) and the efficiency of the confinement system (for persons or the environment) may be monitored by the placement of suitable detectors.

The invention claimed is:

1. A system for continuous flow production of nanometric or sub-micrometric powders under the action of laser pyrolysis comprising:
   a laser operative to emit a laser beam along an axis OX;
   an optical device configured to receive said laser beam and to output an elongated laser beam having energy distributed along a first axis perpendicular to the axis OX in an elongated cross-section with adjustable dimensions, wherein at least one of the width or height of the elongated cross-section is independently changeable; and
   at least two first injectors respectively configured to emit, perpendicularly to a plane in which the axis OX and the first axis lie, at least two flows of reagents in a first interaction area between the elongated beam and these at least two flows of reagents, so that the flows of reagents exiting from the at least two first injectors are all covered by the elongated cross-section of the elongated beam,
   at least two second injectors respectively configured to emit, perpendicularly to a plane in which the axis OX and the first axis lie, at least two flows of reagents in at least a second interaction area between the elongated beam and these at least two flows of reagents, so that the flows of reagents exiting from the at least two second injectors are all covered by the elongated cross-section of the elongated beam,
   wherein there is an absorption of the energy of the laser in said first and second interaction areas until the energy of the laser beam may be entirely absorbed.

2. The system according to claim 1, wherein the elongated cross-section is a rectangular cross-section.

3. The system according to claim 1, wherein the power density of the beam is the same before reaching each interaction area.

4. A system for continuous flow production of nanometric or sub-micrometric powders under the action of laser pyrolysis comprising:
   a laser operative to emit a laser beam;
   an optical device operative to receive said laser beam and to output, in the direction of an axis OX, a laser beam having an elongated cross-section in which a width dimension of the cross-section along a width direction that is perpendicular to the axis OX is greater than a height dimension of the cross-section along a height direction that is perpendicular to the axis OX and to the width direction; and
   at least two first injectors respectively configured to emit two flows of reagents that intersect the elongated beam at a first distance along the direction of the axis OX, but at separate points along an axis that is perpendicular to the axis OX and parallel to the width direction.

5. The system of claim 4, further comprising:
   at least two second injectors respectively configured to emit two additional flows of reagents that intersect the elongated beam at a second distance, different from the first, along the direction of the axis OX, but at separate points along an axis that is perpendicular to the axis OX and parallel to the width direction.

6. The system of claim 4, wherein the elongated cross-section is a rectangular cross-section.

7. The system of claim 4, wherein the elongated cross-section is an elliptical cross-section.

* * * * *